E. B. BEACH.
ANIMAL TRAP.

No. 191,298. Patented May 29, 1877.

WITNESSES:
Chas. Nida
J. H. Scarborough

INVENTOR:
E. B. Beach
BY
ATTORNEYS.

N. PETERS, PHOTO-LITHOGRAPHER, WASHINGTON, D.C.

UNITED STATES PATENT OFFICE.

EDGAR B. BEACH, OF WEST MERIDEN, CONNECTICUT.

IMPROVEMENT IN ANIMAL-TRAPS.

Specification forming part of Letters Patent No. 191,298, dated May 29, 1877; application filed April 30, 1877.

*To all whom it may concern:*

Figure 1:
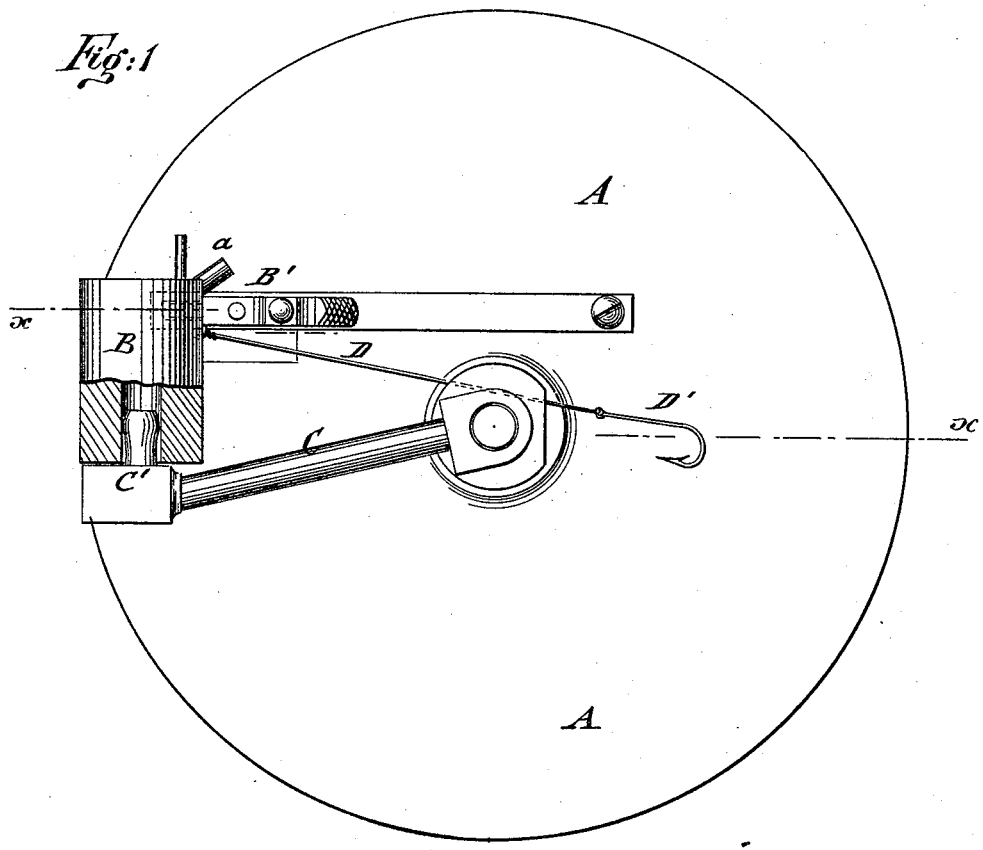
Figure 2:
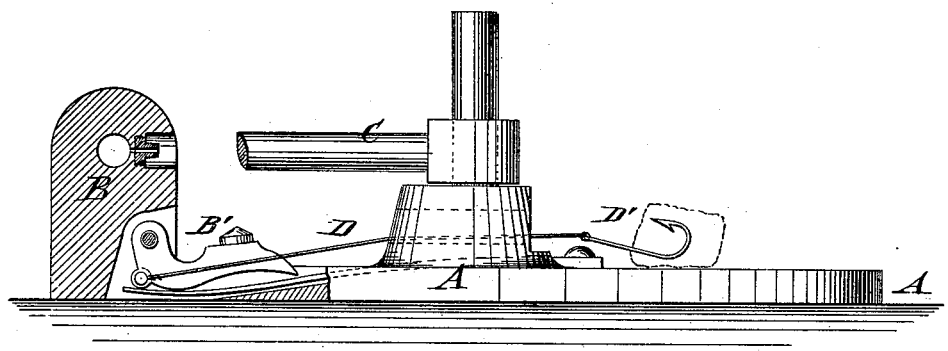

Be it known that I, EDGAR B. BEACH, of West Meriden, in the county of New Haven and State of Connecticut, have invented a new and Improved Animal-Trap, of which the following is a specification:

In the accompanying drawing, Figure 1 represents a plan view, and Fig. 2 a vertical central section on line *x x*, Fig. 1, of my improved animal-trap.

Similar letters of reference indicate corresponding parts.

This invention is designed to provide an effective trap for catching animals by killing the same at the moment when they try to take the bait; and the invention consists of a piston at the end of a pivot-arm propelled in a circle by the discharge of a gun-barrel, as soon as the spring-acted hammer of the same is released by nibbling at the bait.

In the drawing, A represents a base-disk of suitable size, according to the size of animals to be caught. A barrel, B, is cast in one piece with the base-disk at a point of the circumference of the same, and provided with a nipple for percussion-cup, and a spring-acted hammer, B'. A piston, C', at the end of a radial arm, C, that is pivoted to the center of the base-disk, is fitted into the barrel, and shot with considerable force on the discharge of the barrel around a circle until stopped by an anvil, *a*, at the other end of the barrel. The hammer B' is connected by a wire, D, with the bait-hook D', arranged near the center of the disk, the wire being so attached to the hammer that the same is retained by the spring in cocked position, but instantly released for discharging the barrel by the slightest pull on the bait-hook, as shown in Fig. 2. The piston-arm turns on a central seat of the base-disk at the proper height, which, like the disk, is proportioned to the size of the animals to be caught.

If desired, two barrels and pistons, which are discharged by one hammer and cap, may be arranged in symmetrical manner, the pistons meeting, on the discharge of the barrel, half-way, killing the animal at the moment when it takes or tampers with the bait.

The trap is of simple construction, and can be cheaply manufactured, forming an effective gun-trap for killing animals directly without maiming or injuring them.

Having thus described my invention, I claim as new and desire to secure by Letters Patent—

1. An animal-trap formed of a gun-barrel with spring-hammer, of a circularly-moving piston at the end of a pivoted arm, and of a bait-hook and wire connected to the spring-hammer, substantially in the manner and for the purpose set forth.

2. The combination of a base-disk, A, gun-barrel B, having spring-hammer B', piston C' at the end of pivoted arm C, and bait-hook and wire D' D, attached to spring-hammer, to release hammer on pulling of bait and shoot piston, substantially as set forth.

EDGAR B. BEACH.

Witnesses:
   CH. ROCKWELL,
   L. K. CURTIS.